C. S. ROBERTSON.
SIDE WINDOW FOR AUTOMOBILES.
APPLICATION FILED FEB. 2, 1920.
1,383,027.
Patented June 28, 1921.
2 SHEETS—SHEET 1.
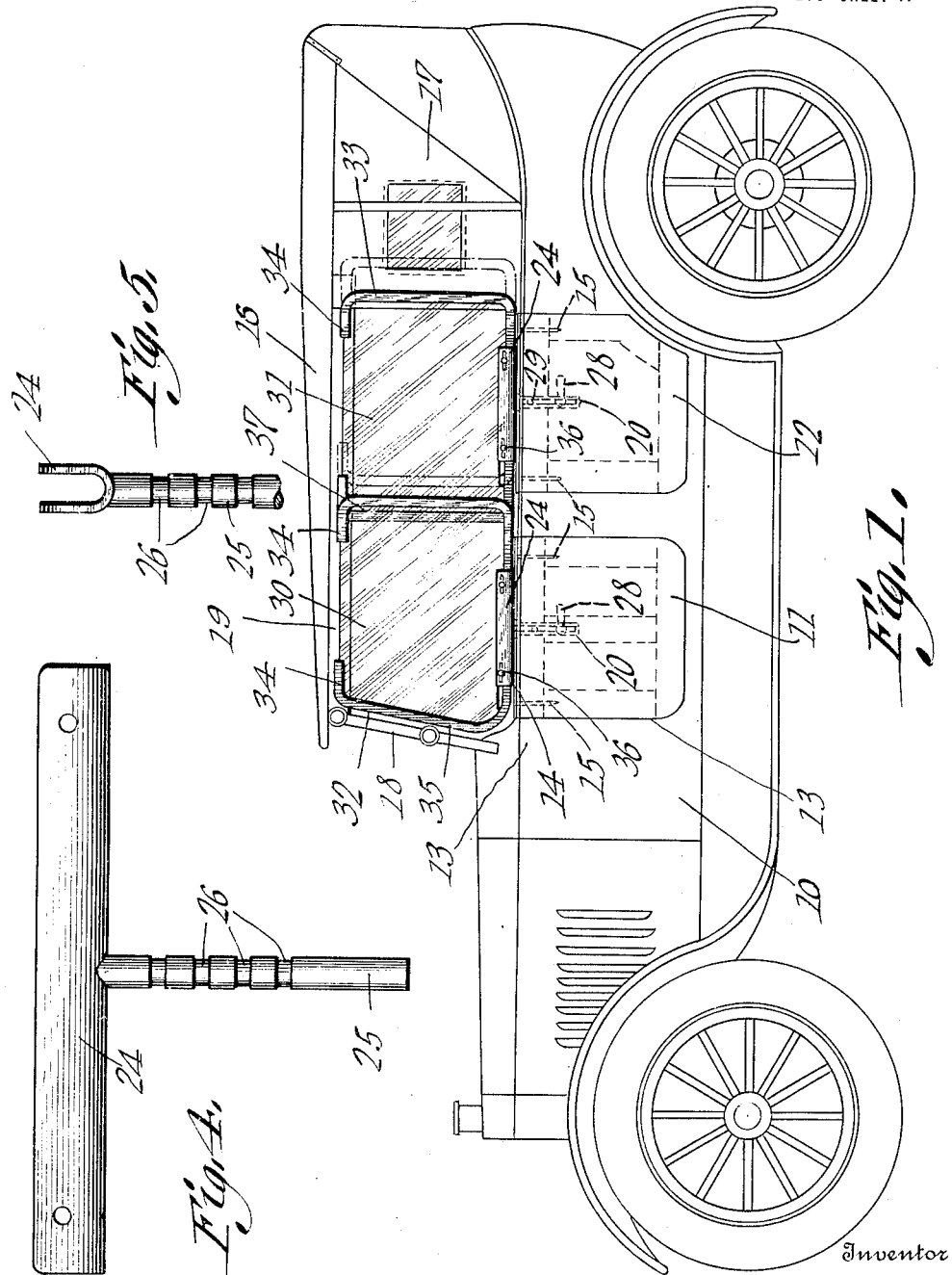
Witness
J. R. Tomlin
Inventor
C. S. Robertson
By C. A. Snow & Co.
Attorneys

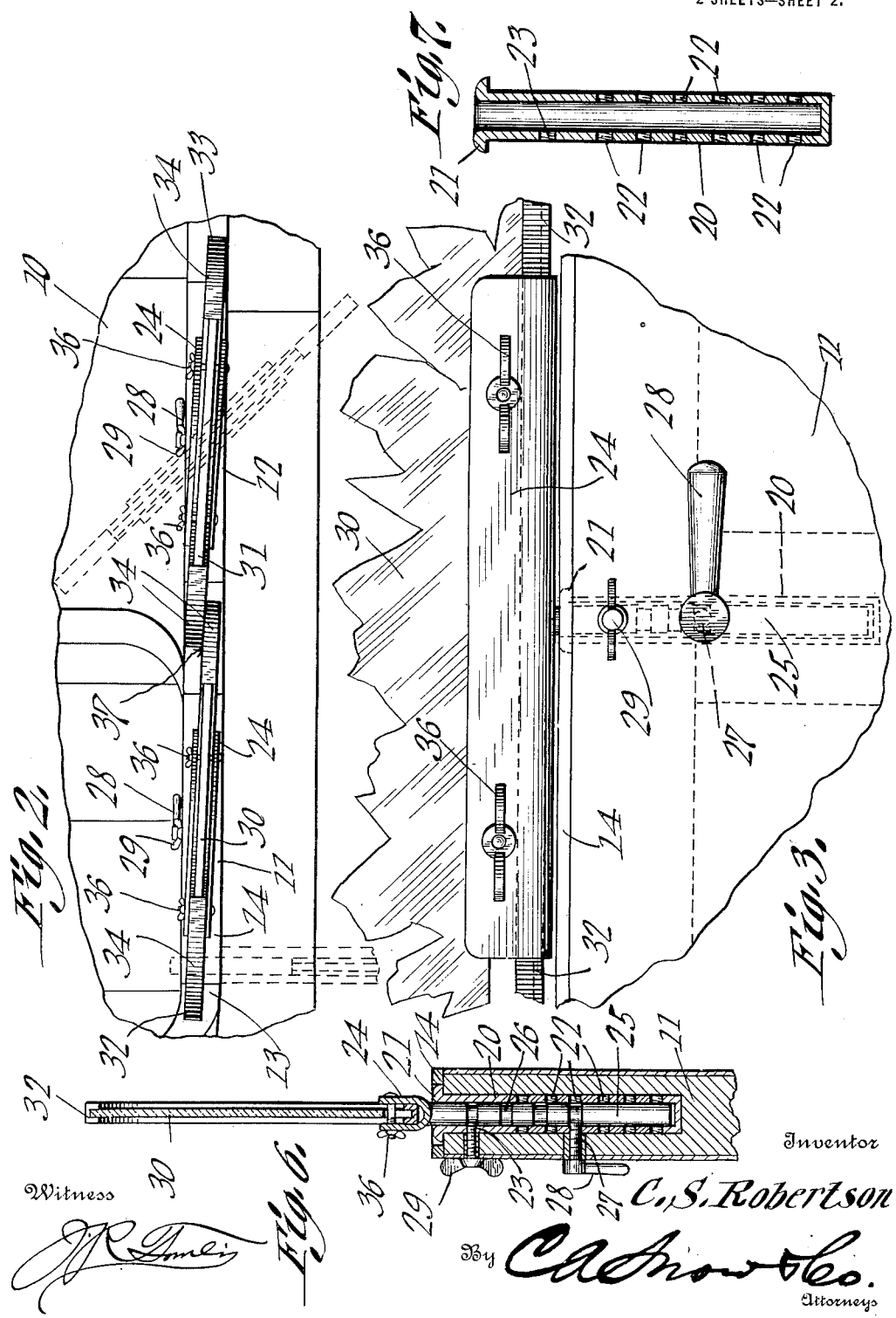

UNITED STATES PATENT OFFICE.

CHRISTOPHER S. ROBERTSON, OF JACKSONVILLE, FLORIDA.

SIDE WINDOW FOR AUTOMOBILES.

1,383,027. Specification of Letters Patent. Patented June 28, 1921.

Application filed February 2, 1920. Serial No. 355,720.

*To all whom it may concern:*

Be it known that I, CHRISTOPHER S. ROBERTSON, a citizen of the United States, residing at Jacksonville, in the county of Duval and State of Florida, have invented a new and useful Side Window for Automobiles, of which the following is a specification.

This invention relates to new and useful improvements in side windows for automobiles, and more particularly to side wind and rain shields for open top or body type passenger cars and trucks, so as to protect the occupants from inclement weather while permitting proper ventilation of the interior of the car or truck to suit the occupants, and in an effective and convenient manner.

The primary object of the invention is to provide improved side wind and rain shields for open body or touring types of automobiles, which may be readily applied to the body and more particularly the doors thereof to replace the ordinary side curtains and provide an unobstructed view for the driver or chauffeur and other occupants of the car, whereby to result immeasurably in the avoidance of accidents ordinarily caused by obstruction of the view of the driver by the usual side curtains, said device being adapted to permit the shields or windows to swing to open and closed positions with the doors of the body, to permit independent sliding movement of the same with respect to each other and the doors so that the said shields or windows may be partly opened or entirely closed as desired, and without interfering with the operation of the doors, as well as to impart to the car the appearance of a permanent or sedan type of top without removing the ordinary top and replacing the same with a permanent or built-in type of top requiring remodeling and involving the owner in much additional cost as compared with the cost of the present device.

A further object of the invention is to provide improved side wind and rain shields for open type body passenger cars and trucks, in which said shields or windows are mounted on the doors of the car for movement bodily with the doors, for sliding movement relative to the doors and to each other, and for pivotal or swinging movement laterally like ventilators, so as to effect the proper ventilation of the interior of the car, allowing the proper supply of fresh air without drafts, novel means being provided in conjunction with the doors for supporting the shields or windows in position for movement or adjustment as above set forth, and for holding the same in adjusted relation, in a simple and effective manner.

With the above and other objects in view, the invention, as will appear as the description proceeds, resides in the combination and arrangement of parts and in the details of construction to be hereinafter more particularly described and claimed, it being understood that within the scope of what is claimed, changes in the precise embodiment of the invention shown may be made without departing from the spirit of the invention.

In the accompanying drawings:

Figure 1 is a side elevation of an open body or touring type of car equipped with the improved side wind and rain shields or windows, in accordance with the invention;

Fig. 2 is a plan view of a fragmentary portion of one side of the body of the car with the top removed, and with the shields applied thereto, the different positions being shown in dotted lines;

Fig. 3 is a side elevation of the parts shown in Fig. 2;

Fig. 4 is a side elevation of one of the supports or holders for the shields or windows;

Fig. 5 is an end elevation of the device shown in Fig. 4;

Fig. 6 is a vertical sectional view through one of the supports and shield thereof; and Fig. 7 is a detailed vertical sectional view of a socket for receiving the shank or spindle of a support.

Referring to the drawings in detail, in which like reference characters indicate similar parts throughout the several views, the numeral 10 designates the body of an open body type of passenger car, equipped in the ordinary or well known manner with the doors 11 and 12 at the front and rear portions of the same for access to the front and rear seats of the car, said doors being hinged at their forward edges to the body at the door frames, in the usual manner, to swing outwardly and forwardly in the frames 13. The top edge of the body and the top edges of the doors are provided with sills or beadings 14 in the ordinary manner. These are usually provided on high priced cars and if not so provided, may be applied and fastened in position by means of screws or the like 15, at each end portion of the sections applied to the top edges of the doors and passing into the frame portions of the doors, it being understood that the doors are made up of transverse and vertical frame members in the usual manner, as shown.

The top of the automobile is designated at 16, being of the usual type having side curtains or curtain portions 17 and having in addition to the usual wind shield 18, depending weather strips or fenders 19 extending downwardly from and carried by the sides of the top bow, for a short distance and overlying the front edge portions of the side curtains or curtain portions 17, as clearly shown in Fig. 1 of the drawings. The doors are bored out from their top edges, intermediately of their lengths and widths to form circular vertical recesses for receiving sockets 20 of similar outline or cross-section and snugly seated therein and provided with top flanges 21 seated or embedded in the sills 14, at their upper ends. These sockets are provided with a plurality of diametrically alined spaced apart transverse threaded openings 22 in the walls thereof at their lower portions and with an additional threaded opening 23 intermediately of its upper portion, for receiving fastening or securing means, clamping means, or otherwise, as will be hereinafter more particularly set forth.

Mounted on the top edge or sill of each door is a channel-shaped supporting member or retainer 24, said members being preferably of U-shaped cross-section as shown particularly in Fig. 5 of the drawings, and having their ends terminating at spaced distances from the ends of the doors, that is, the front and rear edges thereof, and the extremities of the sills or beadings. These members are provided centrally or intermediately of their ends with shank portions or spindles 25 extending downwardly at right angles to engage in the sockets 20 for vertical adjustment or movement, as well as turning movement or rotation, for a purpose which will be hereinafter more fully specified. The shank portions 25 are provided with a series of annular or circumscribing grooves 26 spaced apart, preferably equidistantly and intermediately of the ends of the shank portions, while carried by the socket and engaged with the shank portion is a clamping bolt or screw 27 operable by a lever or handle 28, so that the supporting members may be held from vertical movement or turning in the sockets or adjusted in any desired position of lateral or angular movement and held by binding engagement of the clamping members through the medium of the handles 28, said clamping members preferably passing through the doors from the inside and coöperating with the lower portions of the shanks. Additional clamping members in the form of bolts or screws 29 may be provided to pass through the upper portions of the doors and coöperate with the shanks also, it being understood that said clamping members pass through the holes or apertures in the sockets and engage the grooves in the shanks to bind or hold the latter in adjusted positions. Also, it will be understood that when the clamping members are loosened, the upper members will serve to prevent displacement of the shank portions from within the sockets, and when the windows or shields are adjusted angularly, they may then be secured in adjusted relation, as it is thought will be clearly understood. The upper clamping members are primarily for the purpose of giving additional securing means for the shanks and holders or supporting members, so that the same will be held absolutely steady and against wabbling or displacement due to wind pressure, jar or otherwise.

In order to close the spaces at the sides of the automobile between the side curtains or curtain portions 17 and the shield 18, windows or shields 30 and 31 are provided. These shields or windows consist of frames of U-shaped or channel-shaped cross-section receiving the panes of glass or panels of celluloid or other transparency therein. For instance, the frames may be bent or formed around the panels, said frames being designated at 32 and 33 and having their upper portions formed by the extremities of the strips forming the frames bent inwardly in opposite directions as shown at 34 for a short distance and said portions 34 spaced apart as shown. The forward or front portions of the frames 32 are inclined downwardly and forwardly as shown at 35, so as to fit and conform to the position of the wind shield, although it is to be understood that the wind shield may be vertically disposed, as is common in the art, when the frames will be properly shaped to fit the same or frames thereof.

The frames are fitted in the supporting members or retainers 24 and held by clamping members 36, so that the windows may be longitudinally adjusted or slid open or shut horizontally independently or relatively and especially rearwardly, as shown in dotted lines in Fig. 1 of the drawings, so as to open the windows at the front for ventilating or other purposes. Also, it will be seen that the retainers or supporting members and the windows or shields may be swung to angularly adjusted positions as shown by the dotted line position at the rear window in Fig. 2 of the drawings, it being understood that the supporting members are set in angular positions so that the rear ends of the front windows 30 will fit outside of and overlap the forward portions of the rear windows 31, as shown particularly at 37 in Fig. 2 of the drawings, so that the entrance of rain, wind or snow will be prevented. It will also be obvious that the windows and supporting frames or members may be moved bodily with the doors when the latter are opened or closed, so as not to interfere with the making of entrance and exit to and from the car or automobile, as well as providing a top or arrangement which gives the same appearance as a sedan and the same protection for the occupants as a sedan or limousine, this movement being shown in dotted lines in Fig. 2 of the drawings in connection with the front door, which is shown swung outwardly. It will also be understood that the windows may be vertically adjusted as desired with respect to the sills or upper edges of the doors, so as to properly fit or seat on the latter, and so as to extend up in overlapping relation to the strips or fenders 19, so as to prevent the entrance of rain, wind or the like, and thus more thoroughly protect the occupants.

Thus, it will be seen that I have provided a very simple and desirable attachment structure for open body types of passenger cars or trucks, and particularly touring cars as known in the trade, and one which can be readily applied or removed, without destroying the appearance and structure of the car or top for summer use, and one which will not require the car to be practically remodeled or reconstructed, as where a permanent sedan is made from a touring type of car, at considerable expense. The windows may be removed at will by releasing the clamping members 36, and laid aside when not needed, and the supporting or retaining members may be removed also.

It is to be understood that bolts, set screws or other clamping means may be engaged through the openings in the supporting members for clamping the shields or windows in position and that such clamping means may engage the panels or frames, the openings in the supporting member being threaded for engagement by the screws, or bolts, if desired. Furthermore, it is to be understood that the doors 11 and 12 may be hinged at their forward edges to the body at the door frames in the usual manner or may be hinged at the rear edges, either one forward and the other rearward, or both in the same way. It is also to be understood that the doors 11 and 12 are provided with the transverse and vertical frame members on high priced cars, but if not so provided, they may be applied and fastened in position by means of screws or the like. While the device is shown applied to a touring car it is to be understood that it may be applied to roadsters, sport models, and any and all types of open car bodies, including trucks and that one, two or more shields or windows may be employed, depending upon the style of car or body and the length of the space to be closed.

Having thus described my invention, what I claim is:

1. The combination with the door of a vehicle body, said door having a socket extending downwardly thereinto, a shank mounted for rotation within the socket, said shank having spaced annular grooves, means projecting into the grooves for supporting the shank and for holding the same against rotation, a longitudinally channeled member fixedly connected to the upper end of the shank and mounted for vertical and angular adjustment with the shank, a frame detachably and slidably mounted within the channeled member and constituting a shield, and means within the channeled member for engaging the frame to hold it in upstanding position within the channeled member and against movement relative thereto.

2. In side wind and rain shields for open body type of automobiles, having a top and side curtain parts at the rear portions thereof together with fenders depending from the sides of the top; of sockets mounted in the doors of the body, open supporting members mounted on the top edges of the doors and having shank portions engaged in the sockets for pivotal adjustment laterally and vertical adjustment, means engaged through the doors and sockets and engaged with the shank portions to hold the supporting members in adjusted relation, and means to close the space between the top and body, and comprising shields mounted in the supporting members.

3. In side wind and rain shields for open body type of automobiles, having a top and side curtain parts at the rear portions thereof together with fenders depending from the sides of the top; of sockets seated in the doors vertically from the upper edges thereof intermediately, channel-shaped supporting members mounted on said top edges and having grooved shank portions engaged in the sockets for pivotal movement, clamping means carried by the doors and engaged through the sockets and with the shank portions at the grooves thereof, framed shields mounted in the supporting members detachably, and extending between the said members and the top fenders, clamping means carried by the members and engaged with the shields, said shields being disposed angularly in overlapping relation between the usual wind shield and side curtain parts, and additional clamping means for the shank portions, said shields being adapted for lateral pivotal adjustment and movement bodily with the doors.

In testimony that I claim the foregoing as my own, I have hereto affixed my signature in the presence of two witnesses.

CHRISTOPHER S. ROBERTSON.

Witnesses:
G. R. WILLIAMSON,
ALONZO C. NOLAN.